A. M. AMOS.
Steam-Cooker.
No. 220,048. Patented Sept. 30, 1879.
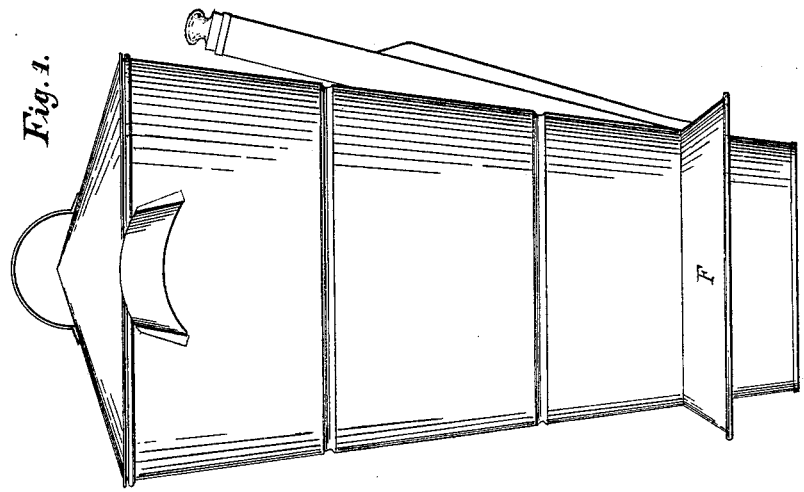
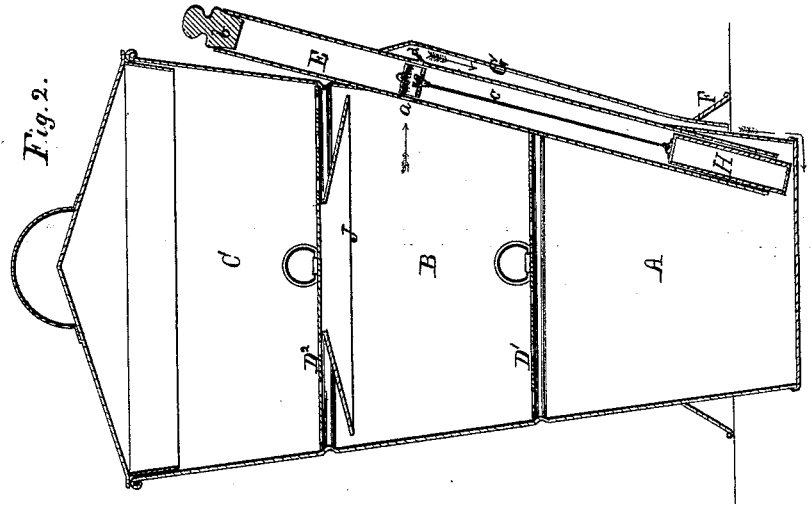
Witnesses:
Charles P. Frost.
Wm H. Stevens.
Inventor:
Alexander M. Amos

UNITED STATES PATENT OFFICE.

ALEXANDER M. AMOS, OF LEWISTON, MAINE.

IMPROVEMENT IN STEAM-COOKERS.

Specification forming part of Letters Patent No. 220,048, dated September 30, 1879; application filed February 8, 1879.

*To all whom it may concern:*

Be it known that I, ALEXANDER M. AMOS, of Lewiston, in the county of Adroscoggin and State of Maine, have invented a new and useful Improvement in a Steam-Cooker, of which the following is a specification.

The novelty of my invention consists of a float for the purpose of gaging the water in the said cooker; and it also consists of an alarm for the purpose of indicating that the cooker is in danger of burning for lack of water.

In the drawings, Figure 1 represents an elevation; Fig. 2, a sectional view of the cooker; and Fig. 3 is a perspective view of the alarm-whistle and float.

The body of the cooker is provided with two perforated false bottoms, $D^1$ $D^2$, thus making three sections, A B C, as shown in Fig. 2.

E is a tube, which is made to pass through the side of the cooker, for the admission of water into section A.

When in use the lower part of section A fits into the stove, and the entire weight of the cooker is supported by an inclined hoop, F, as shown in Fig. 1.

The escaping steam and the scent of the food are made to pass into the stove by means of a tube, G, which is formed on the exterior of the tube E, and is made to communicate at the upper end with the interior of the cooker by means of an aperture, $a$, through the tube E. The lower end of the tube G is made to pass through the inclined hoop F, and, being open at the bottom, communicates with the stove, making a free passage for the outlet of the steam.

H is a hollow air-tight float having a wire rod, $c$, an alarm-whistle, I, being attached to the upper end, as shown in Fig. 3.

When the section A is filled with water, the float H is made to rise, and the alarm-whistle I will appear at the extreme upper end of the tube E. As the water diminishes the float H and the alarm-whistle I will gradually fall, so that by taking out the stopper $b$ the exact amount of water remaining in section A can be ascertained at any time.

To provide against injury to the cooker in case the water should not be replenished at the proper time, the alarm-whistle I is so arranged that when a certain amount of water has boiled away the float H will rest upon the bottom of the cooker, and the escaping steam will be made to pass through the whistle I and give an alarm.

To prevent the water from flowing into the tube G as it passes down the tube E into section A, a lip, $d$, is placed underneath the aperture $a$, as shown.

To prevent the drippings from the food in section C from falling upon the food in section B, the perforated disk $D^2$ is provided with an inclined hood, J, the outer edge of which terminates near the side of the cooker, and as the disk $D^1$ is much smaller than the disk $D^2$, the drippings from the inclined hood J will fall on the side of the cooker and pass into the water in section A without mingling with the food in section B.

To prevent the alarm-whistle I from binding upon the side of the tube E, the wire rod $c$ is secured to the float H by means of a loop or joint, $e$, as shown.

Having thus described my invention, what I claim as new, and desire to secure by Letters Patent, is—

The alarm-whistle I, in combination with the float H, rod $c$, tube E, aperture $a$, and tube G, substantially as shown and described.

ALEXANDER M. AMOS.

Witnesses:
CHARLES S. FROST,
A. S. PERHAM.